United States Patent [19]

Dufourneaud

[11] Patent Number: 5,383,746
[45] Date of Patent: Jan. 24, 1995

[54] PROCESS AND DEVICE PROVIDING TIGHTENED OPERATIONAL SAFETY FOR UNDERGROUND LIQUEFIED GAS STORAGE

[76] Inventor: Jean-Marie Dufourneaud, 31, rue du Cottage, 92410 Ville d'Avray, France

[21] Appl. No.: 910,119
[22] PCT Filed: Nov. 4, 1991
[86] PCT No.: PCT/FR91/00860
 § 371 Date: Jul. 15, 1992
 § 102(e) Date: Jul. 15, 1992
[87] PCT Pub. No.: WO92/08662
 PCT Pub. Date: May 29, 1992

[30] Foreign Application Priority Data

Nov. 15, 1990 [FR] France ............................. 90 14208

[51] Int. Cl.⁶ .................................................. B65G 5/00
[52] U.S. Cl. ................................................. 405/53; 405/59
[58] Field of Search ........................ 405/52, 53, 54, 55, 405/59, 128

[56] References Cited

U.S. PATENT DOCUMENTS

| | | | |
|---|---|---|---|
| 3,807,181 | 4/1974 | Kuhne | 405/59 |
| 4,417,829 | 11/1983 | Berezoutzky | 405/59 X |
| 4,596,490 | 6/1986 | Van Fossan et al. | 405/53 X |
| 4,701,072 | 10/1987 | Berezoutzky | 405/53 |
| 4,732,508 | 3/1988 | Berezoutzky | 405/53 |

FOREIGN PATENT DOCUMENTS

| | | |
|---|---|---|
| 0013854 | 8/1980 | European Pat. Off. |
| 0214890 | 3/1987 | European Pat. Off. |
| 0217693 | 4/1987 | European Pat. Off. |
| 57-90301 | 6/1982 | Japan ........................ 405/53 |
| 90/05687 | 5/1990 | WIPO |

*Primary Examiner*—Randolph A. Reese
*Assistant Examiner*—John Ricci
*Attorney, Agent, or Firm*—Bacon & Thomas

[57] ABSTRACT

A safety device is provided for completely sealing off an underground liquified gas storage cavity when a dangerous situation arises, whereby all links between the storage cavity and the surface, including the vent link between the gas phase and the surface can be closed off by forming water plugs in the storage cavity. The water plugs are created automatically from existing reserves of water in the underground cavity. Maximum overall safety is achieved by not installing any important equipment in the underground storage cavity, by standardizing all links other than the vent link, and by minimizing the number of functional links required. Every standard link connects the gaseous or liquid phase of the gas to the surface via a side tube running downwards into a well containing water linked to the main tube which returns to the surface. The end of the main tube comprises a shut-off valve which causes the sealing water plug to be formed in both tubes once it is opened automatically or deliberately via an external signal.

17 Claims, 4 Drawing Sheets

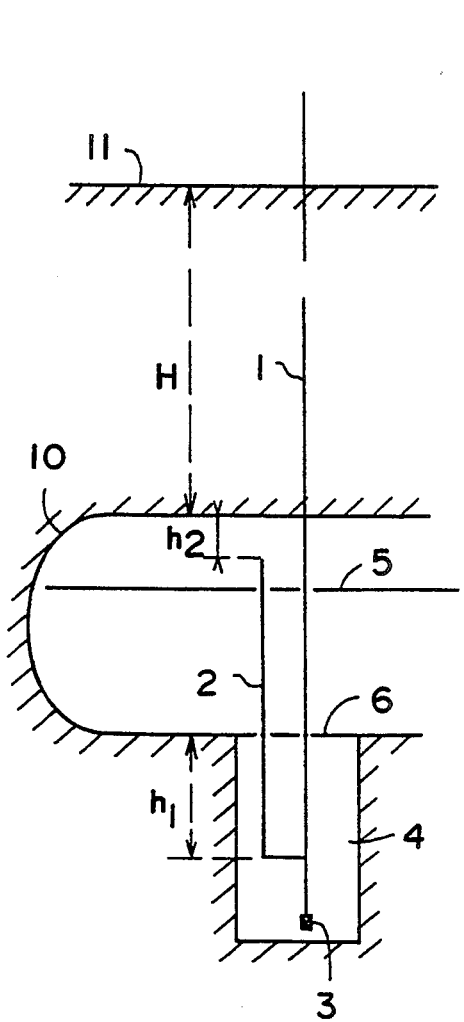
FIG_1
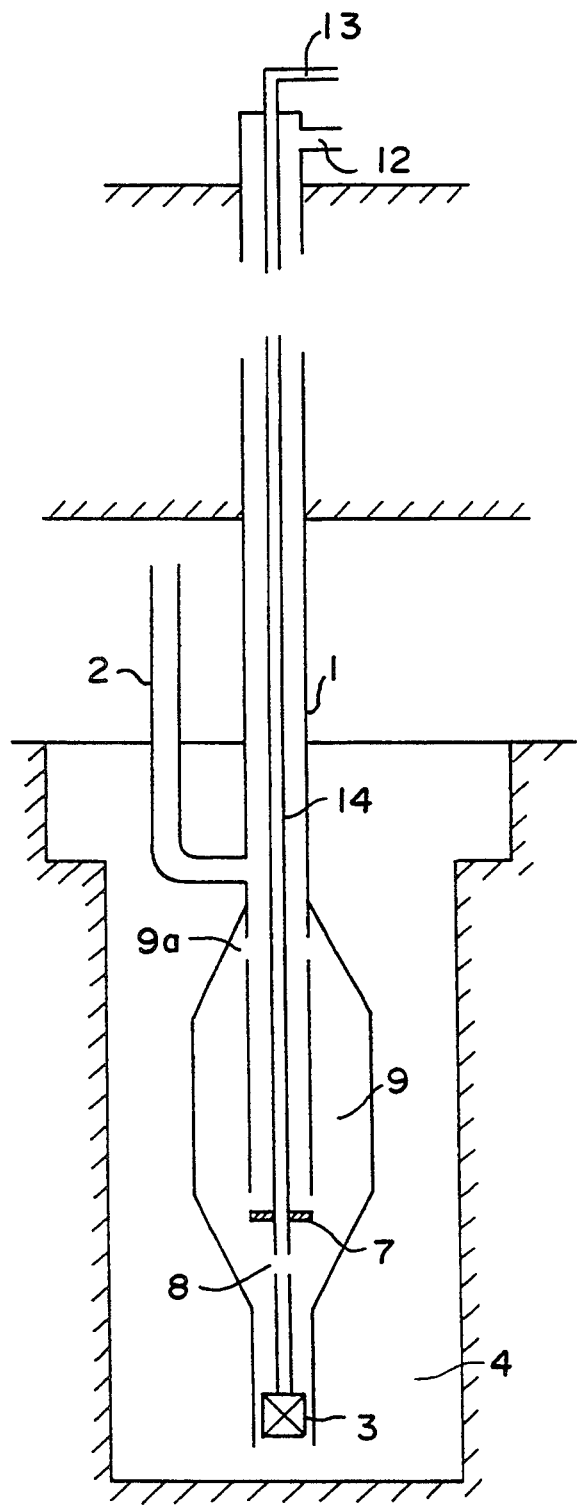
FIG_2

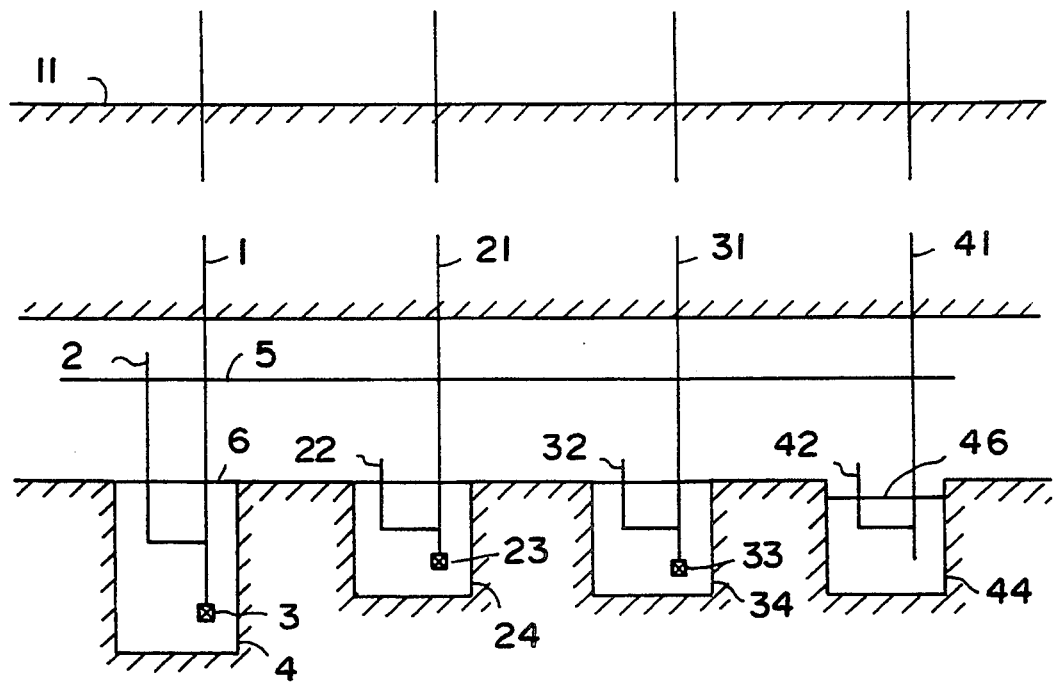
FIG_3
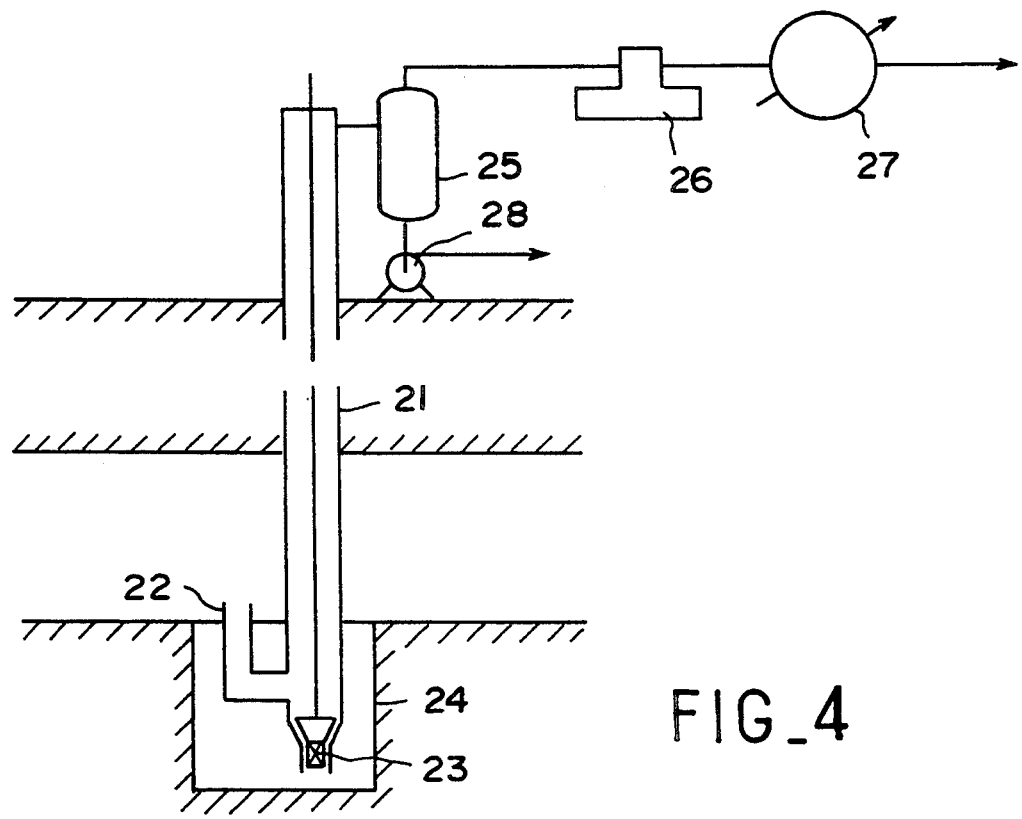
FIG_4

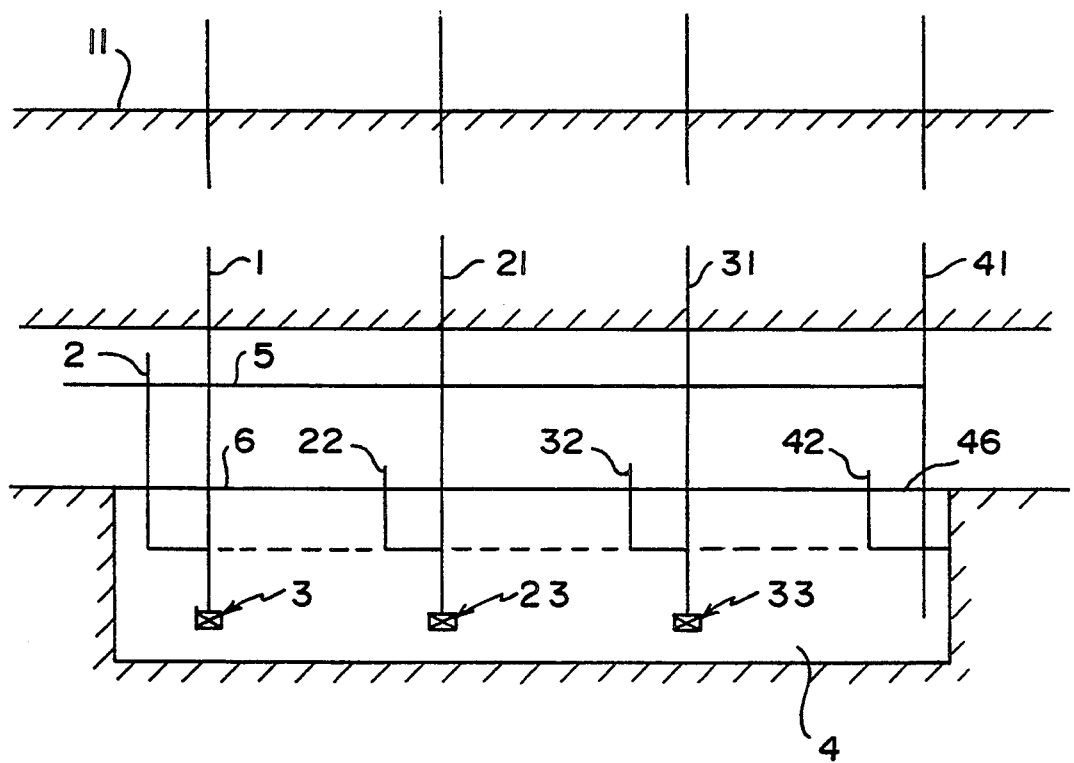
FIG_3a

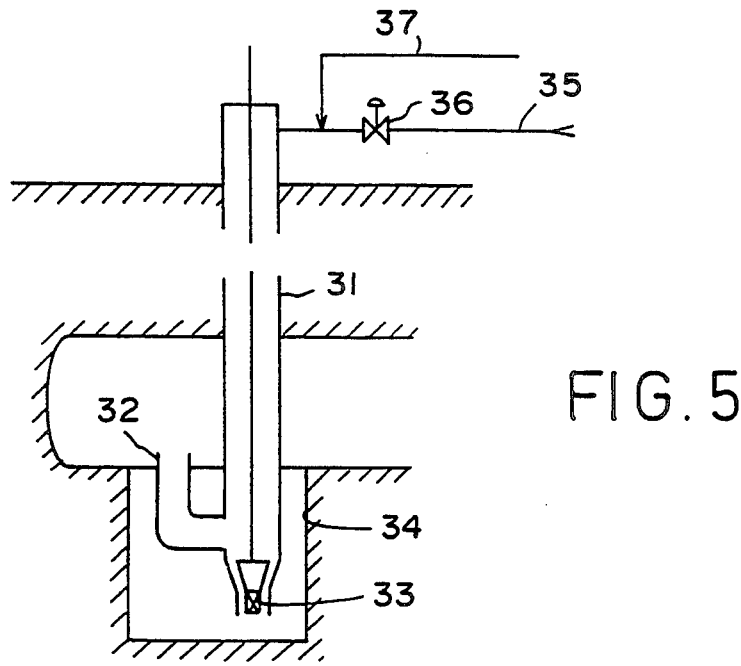
FIG. 5
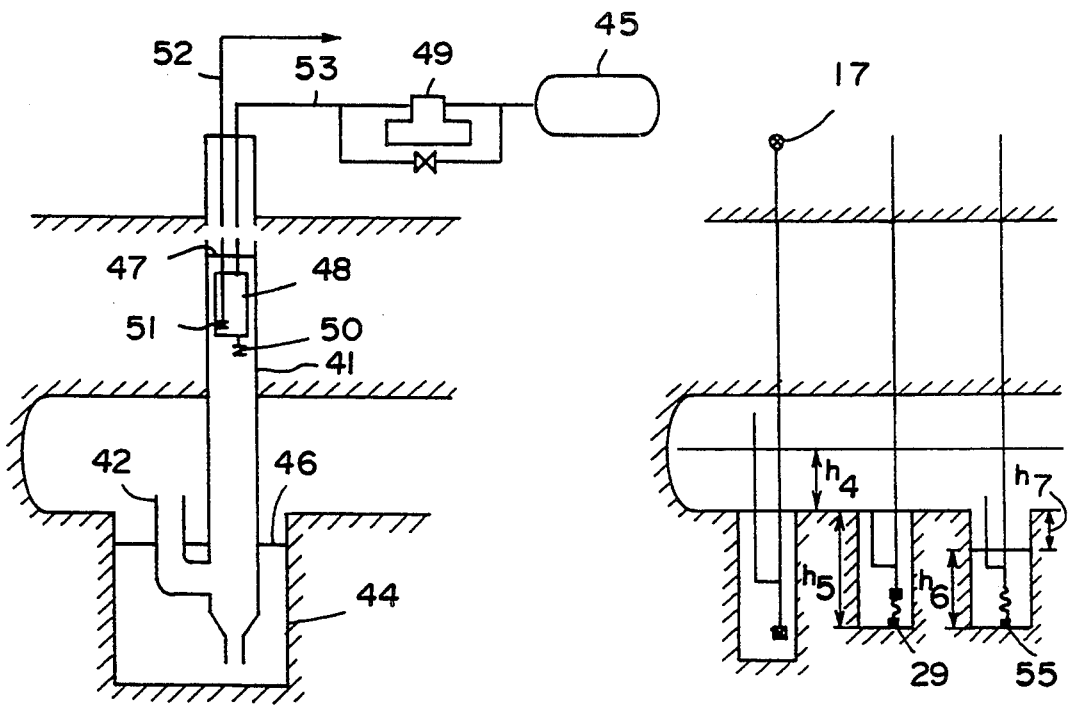
FIG. 6
FIG. 7

PROCESS AND DEVICE PROVIDING TIGHTENED OPERATIONAL SAFETY FOR UNDERGROUND LIQUEFIED GAS STORAGE

BACKGROUND OF THE INVENTION

Present invention concerns a process and design to ensure the safety of a liquefied gas underground storage.

Usually the storage involves several galleries of specific size and lay-out and located at calculated depth according to the stored product so that the pressure of water in the surrounding rock is slightly greater than the liquefied gas vapour pressure at the ground temperature which means that ground water can flow towards the storage and prevent the liquefied gas from flowing outwards so that the storage is tight. Inside a storage gallery the ground water is dripping along the walls towards the floor and accumulates in the low points. Above the water is the liquid phase of the liquefied gas and in all the upper volume of the storage is in the gas phase.

Various piping connections provide the necessary links between storage and surface to operate the storage, such as, filling and pumping out the product, pumping out the seepage water, level and temperature indications, alarms.

With regard to danger aspect, two cases may be considered. Liquefied natural gas (mainly methane) is lighter than air and leaks are not too dangerous considering that they very quickly dilute and disappear towards the upper atmosphere. The other liquefied gases such as propane or butane are heavier than air and are very dangerous considering that leaks create layers on the ground flowing and diluting very slowly in windless atmosphere.

Concerning the danger of the leaks that may happen on a piping connection between storage and surface the vent line linking directly the gas phase to the surface must be considered separately: any break on the vent may result in emptying completely the storage quickly and continuously because the whole storage surrounding rock provides a tremendous heat source to boil the stored product after a partial pressure drop and correlated equilibrium temperature drop. The other liquid connections are potentially less dangerous considering that the liquid column in the leaking vertical pipe partly balances the storage pressure and that the only boiling takes place in the upper part of the leaking pipe which represents a very limited heat source compared to the whole storage.

Usually the vent line is a vertical rising fixed pipe connecting directly the gas phase to the surface and which cannot be isolated. The design according to the invention solves that disadvantage by the removal of the vent connection in case of danger straight inside the storage.

Usually the connections from storage to surface involve heavy mechanical, electrical or instrument equipment located inside the storage. Their maintenance or repair may require frequent operations, potentially dangerous, needing heavy equipment. The process according to the invention solves that disadvantage by removing all heavy equipment out of the storage and moving their function to ground level.

Usually each connection between storage and surface is devoted to one function only, resulting in the impossibility of replacing one with another, which can lead to potentially dangerous operating situations in case of temporary or definitive failure. The process according to the invention solves that problem by the standardization of all the connections except the vent line which permits replacement of one by another and preserving the safety of operations.

Usually the connections between storage and the surface are fitted with safety valves and sometimes some can be better isolated at the level of the storage by means of a water plug balancing the storage pressure; but the creation of these plugs needs manual operation and water injection from the surface at the time they are decided which may be difficult or even impossible if the area is already dangerous or equipment already destroyed. The design according to the invention solves the problem as it gives the possibility to isolate all connections from the storage including the vent line with water plugs which are created automatically without manual operation or water injection because the water for the plugs is already present in reserves inside the storage.

Usually the underground storage is protected against overfilling which is the main risk as to the possibility of overpressure mainly during reception of large refrigerated cargoes at a large flow rate. Nevertheless the protections are based upon alarms and safety set points given by level instruments which do not measure always the true storage level and which may drift with time. The design according to the invention solves this problem as it is related to the true storage level when it detects the maximum allowed filling level and that the set point cannot break down.

BRIEF DESCRIPTION OF THE DRAWINGS

FIG. 1 schematically shows the vent line system according to the invention.

FIG. 2 is a detailed schematic of the vent line system illustrating the structure used to recover the venting function after the system has been placed under hydraulic safety protection.

FIG. 3 illustrates a preferred flow scheme with various connecting lines between the underground storage and the surface.

FIG. 3a illustrates another preferred flow scheme with various connecting lines between the underground storage and the surface.

FIG. 4 depicts the connecting line for the stored liquified gas extraction in accordance with the invention.

FIG. 5 shows the connecting filling line incorporated in the vent line system of the invention.

FIG. 6 shows the seepage water pumping line incorporated in the vent line system of the invention.

FIG. 7 illustrates the positioning of various pressure gauges for use in the vent line system of the invention.

DETAILED DESCRIPTION OF THE PREFERRED EMBODIMENTS

FIG. 1 shows the general diagram of the vent line according to the invention. It links the underground storage (10) to the surface (11) through the main tubing (1) ending-its low part in a water sump (4). The lateral tubing (2) is connected to the main tubing (1) at a point located at the depth h1 inside the sump. The main tube (1) ends in the water sump with a valve (3) usually hydraulically or pneumatically operated through which it is possible to open or close the main tubing (1)

towards the water sump. The vent function, which means direct access to the storage vapour phase is obtained when the valve (3) is closed and the water level inside the main tubing (1) is lower than the lateral tubing (2) connecting point on the main tubing (1). In the storage, water fills the sump (4) up to a level (6) corresponding in most situations to the storage floor level. The stored product liquid phase fills the low part of the storage up to liquid level (5). The lateral tube (2) opens in the storage gas phase above the liquid level (5) and the link from the gas phase towards the operating surface equipment is properly achieved through the line formed by the lateral tubing (2) and main tubing (1). According to a characteristic of the invention the vent function can be instantly removed and the whole vent system turned to a safety position by merely opening the valve (3). As a result the sump (4) water flows then inside the main tubing (1) above the lateral tubing (2) connection. In the lateral tubing (2) the water reaches immediately a clear equilibrium point corresponding to the hydrostatic balance between inside and outside of the tubing taking into account that the inner water column has to balance outside a water height plus the height of product liquid phase in the storage, which means that the higher the liquid level in the storage, the higher the water level in the lateral tubing (2). Inside the main tubing (1) the water will flow upwards to an equilibrium point which is related to the status of surface equipment. If the main tubing (1) line stays closed at the surface and that its pressure is kept close to the storage vapour pressure then the level in the main tubing (1) will stabilize close to the level in the lateral tubing (2). On the opposite, if there is a pressure fall, due to opening to atmosphere for instance, the water column in the main tubing (1) will have to balance the storage pressure. This is the sizing case which needs the greatest quantity of water. If h1 is the depth in the water sump (4) of the lateral tubing (2) connecting point on the main tubing (1), then the upper sump cross section, along the height h1 must be equal or greater than S so that the volume h1*S will be enough to cover the maximum water need stated above. For sump part deeper than h1 the cross section may be different from S.

As indicated above, FIG. 2 presents the detail according to the invention of the design that makes it possible to recover the vent function after the system was placed under hydraulic safety protection.

According to a characteristic of the invention the vent function recovery after a hydraulic safety operation is reached by pushing out the main tube (1) and the lateral tube (2) water plugs back towards the water sump (4). To push the water plugs various fluids may be used such as a vapour phase corresponding to the stored liquefied gas (propane gas for a liquid propane storage for instance) or a similar gas (propane gas for a liquid butane storage for instance) or an inert gas (nitrogen for instance). This so called push gas must be available at high enough pressure always higher than the underground storage pressure.

According to another characteristic of the invention, the main tubing (1) is surrounded with an annular reserve (9) located immediately down the junction point of lateral tubing (2) on main tubing (1). The main tubing (1) ends or is perforated with important holes close to the lower part of the reserve (9). The main tubing (1) is then continued downwards on a sufficient height to receive the valve (3) and achieve the tightness continuity towards outside. The tightness will be obtained either directly between the valve (3) and the main tubing (1) or using an intermediate part and with a classical gasket available. The valve (3) is the only underground mechanical piece and is fitted at the end of a standard tubing column (14) properly sized which keeps the valve at its right working position, which is used to pull up the valve for maintenance or repair and then to replace it at its working position. During all these above operations of the tubing column (14), the main tubing (1) is under hydraulic safety protection and the vent function is removed. The valve (3) is open and push gas is introduced through a nozzle (12) at the top of the main tubing (1) in order to push the water down to the junction point of lateral tubing (2) on main tubing (1). Then through the top nozzle (13) of the tubing column (14) holding the valve (3) a push gas quantity is quickly injected towards the external reserve (9). This push gas flows out of the tubing column (14) through holes (8) located near the bottom of the reserve (9). This gas is diverted away by means of a crown deflector (7) fitted above the holes (8) but lower than the opening of main tubing (1). Therefore this gas flows upwards inside the reserve (9) annulus. The reserve (9) water is pushed by the gas down towards the water sump (4) through the valve (3). Then the valve has to be quickly closed. In this situation the main tubing (1) water plug is pushed down to the connection point with the lateral tubing (2) but the water plug in the lateral tubing (2) is still in place. In the upper part of the reserve (9) some small diameter holes 9a are drilled in the main tubing (1) sized for a slow escape of the trapped push gas from the reserve towards the main tubing (1). The reserve annulus water level can then rise. The main tubing (1) water level which was stopped at the junction point with the lateral tubing (2) can now drop and make room for the lateral tubing (2) water plug to flow down the junction point. It has to be noted then that the reserve annulus volume must be sized to cover the maximum possible volume of the lateral tubing (2) water plug.

As indicated above, FIG. 3 presents the principle flow scheme of the various connecting lines between storage and surface. Heavy mechanical, electrical equipment or electronics are there to achieve the basic functions, except the vent, in order to operate the storage, such as: liquefied gas reception and pumping out; seepage water pumping out; level, temperature, pressure indications and alarms. According to a characteristic of the invention all heavy equipment is installed at ground level and therefore gives the possibility to design a standard line between the storage and the surface which may be used indifferently for one function or the other with the exception of the vent. Depending on the operating options each operating function may be achieved through one or more connecting lines from storage to surface. For instance FIG. 3 depicts one liquefied gas extraction line (21) one filling line (31) and one seepage extraction line (41). Each standard line involves a lateral tubing (22,32 or 42 depending on the function actually achieved) which opens in the liquefied gas liquid phase immediately above the storage floor level, then leads downwards to the water reserve sump (24,34 or 44) and is then connected to the main tubing (21,31 or 41) leading to the surface. Of course, separate sumps (24, 34 and 44) can be provided or a single large sump (indicated at 4 in the FIG. 3a embodiment) can be utilized within the scope of the invention. The lateral tubing is connected to the main tubing inside the water sump below the storage floor which represents the stored liquefied gas low level. The main tubing ends under the connecting point with a tight isolation valve (23 or 33) necessary for all connecting lines except the seepage water extraction line. Due to the permanent ingress of seepage water, all the water sumps (24,34 or 44) are full of water and under normal operation all water levels in the water sumps are exactly at the storage floor level except the seepage water sump level which is lower as indicated at 46. Of course, the important aspect with respect to the water sump level is that it is below the top ends of the lateral tubes (22, 32 and 42).

According to another characteristic of the invention and just as for the vent line, if h2 is the depth of the lateral tubing (22,32 or 42) connection point on the main tubing (21,31 or 41) in the water sump (24,34 or 44), the upper sump area over the height h2 must be equal to or greater than S2 such that the volume h2*S2 is great enough to cover the maximum water need to create the safety water plug. In most cases the water sump is reasonably small and the valve (23 or 33) not too deep in it. The liquefied gas specific gravity being d and s the cross section of the valve (23 or 33) holding tubing which opens in the sump, the vertical upwards force applied to the valve, under normal operation conditions, is proportional to the product s*(1-d)*h2 of the tube cross section multiplied by specific gravity difference between water and stored liquefied gas and multiplied by h2. This thrust is not important and means that the valve positioning and bearing present no difficulty: either the vertical thrust is balanced with a counterweight and the valve can be positioned with a cable, or the valve is positioned down a rigid tubes string. Any failure with the valve fastening or tightness is strictly harmless from a safety aspect as it results in a water flow into the tubings, the connection line changing to hydraulic safety position.

As mentioned above, FIG. 4 shows the connecting line for the stored liquefied gas extraction. According to a characteristic of the invention it is achieved under liquid/gas mixed phase through lateral line (22),then main line (21), water sump valve (23) being closed. The mixed phase is separated in the knock out drum (25) which gas phase is sucked by the compressor (26) and discharged to the condenser (27). The condensate is either kept at surface or sent back to storage. The knock out drum (25) liquid phase is pumped to users through the pump (28). According to the characteristic of the invention the mixed phase extraction results in a noticeable decrease of the k.o. drum (25) liquid water content compared to storage liquid water content. In many cases this effect is enough to avoid any additional drying treatment process.

FIG. 5 shows the connecting filling line. Large filling flow rates receptions concern large refrigerated product cargoes. According to a characteristic of the invention this large flow rate reception is achieved under liquid/gas mixed phase through the main line (31), then the lateral line (32), the valve (33) being closed. The refrigerated liquefied gas is received in the reception line (35) and its pressure is reduced in the control valve (36) to a pressure slightly lower than the storage pressure at stabilized rate of flow. A determined flow rate of storage gas is introduced from the vent line to the filling line downstream the control valve through the gas line (37). According to a characteristic of the invention the gas injection into the filling line results in a steady rate of flow in the vertical main tubing (31) and results in storage pressure control due to the storage gas phase consumption and also results in a partial heating of the incoming refrigerated product due to the injected gas condensation.

FIG. 6 shows the seepage water pumping out line. According to a characteristic of the invention it is achieved in the main tubing (41) that opens into the water sump (44) resulting in water level (47) rise in the main tubing (41) where is located a cylinder (48) the bottom of which is fitted with a no-return check-valve which lets the main tubing (41) water flow into the cylinder (48). The cylinder is connected to ground level through a discharge line (52) with its suction located close to the cylinder bottom and fitted with a no-return check-valve 51 preventing the discharge line (52) to empty back into the cylinder (48), the cylinder receives through the Gas line (53) a pressurised Gas from a reserve drum (45) in order to push the cylinder (48) water content out through the discharge line (52) during a first step. During the second step the cylinder (48) gas is sucked back by the compressor (49) and discharged towards the reserve drum (45) which results in a new water filling of the cylinder (48). Alternate steps repeat as necessary. The compressor/reserve drum package is not dedicated only to one particular line.

According to the invention, FIG. 7 shows the location of the three pressure gauges that are enough to determine all the storage necessary levels and pressures. The vent gauge 17 gives the storage gas phase pressure after connection with the vent tubing gas column. The gauges 29 and 55 are located at similar predetermined levels such as for instance the water sumps bottoms or the valves levels or the main tubings ends (21,31 or 41). The gauge 55 is in the seepage water sump and h6 is the sump water height above it; the gauge 29 is in another sump and h5 is the sump water height above it (water level is located at storage floor). Let all pressures be converted into water heights and call H the storage pressure from gauge 17,and H29 and H55, the pressures of gauges 29 and 55,:

Seepage sump water depth: $h7=(H29-H55)/(1-d)$

Stored liquid with sp.gr.d: $h4=(H29-h5-H)/d$

Additional independent indications may be obtained from other gauges positioned in other water sumps for alarms or safety trips for instance. A temperature gauge may also be positioned with one or several pressure gauges.

What is claimed is:

1. A method of sealing an underground liquified gas storage area having at least one gallery with liquified and vaporized gas sections subject to a flowing in of ground seepage water towards the storage area caused by the interstitial pressure of the ground seepage water being higher than the stored liquified gas vapor pressure in the storage area comprising:

provide at least one water sump in the storage area, below the gallery;

providing a connection tube from the at least one water sump to the surface;

providing a vent tube from the vaporized gas section to the surface through the connection tube; and providing means housed within the storage area for sealing the connection and vent tubes with water from the at least one water sump to prevent flow from the storage area to the surface.

2. The method of sealing an underground liquified gas storage area according to claim 1, further comprising:

extending said vent tube from the vaporized gas section, through the liquified gas section, into the at least one water sump and joining said vent tube to said connection tube within the at least one water sump.

3. The method of Sealing of an underground liquified gas storage area according to claim 2, comprising:
providing an isolation valve as part of said means housed within the storage area for sealing the connection and vent tubes within said connection tube, below the location at which said vent tube is joined to said connection tube, for movement between at least first and second positions wherein, in the first position, said isolation valve prevents the ingress of water from the at least one water sump into said vent and connection tubes and, in the second position, said isolation valve permits the ingress of water into said vent and connection tubes so as to develop water plugs therein.

4. The method of sealing an underground liquified gas storage area according to claim 3, further comprising:
providing means for restoring free fluid communication between the vent tube and the surface by injecting a pressurized gas into said connection tube so as to push the water creating the water plugs back into the at least one water sump.

5. The method of sealing an underground liquified gas storage area according to claim 2, further comprising:
providing a liquid/gas extraction tube extending between the at least one water sump and the surface;
providing a lateral tube extending from the liquified section into the at least one water sump and joining the liquid/gas extraction tube within the at least one water sump; and
providing a second isolation valve within said liquid/gas extraction tube, below the location at which said lateral tube is joined to said liquid/gas extraction tube, for movement between at least first and second positions wherein, in the first position, said second isolation valve prevents the ingress of water from the at least one water sump into said lateral and liquid/gas extraction tubes and, in the second position, said second isolation valve permits the ingress of water into said lateral and liquid/gas extraction tubes so as to develop water plugs therein.

6. The method of sealing an underground liquified gas storage area according to claim 5, further comprising:
providing a filling tube extending between the at least one water sump and the surface;
providing a second lateral tube extending from the liquified section into the at least one water sump and joining the filling tube within the at least one water sump; and
providing a third isolation valve within said filling tube, below the location at which said second lateral tube is joined to said filling tube, for movement between at least first and second positions wherein, in the first position, said third isolation valve prevents the ingress of water from the at least one water sump into said second lateral and filling tubes and, in the second position, said third isolation valve permits the ingress of water into said second lateral and filling tubes so as to develop water plugs therein.

7. An arrangement for safely extracting from and sealing an underground gas storage area having at least one gallery with liquified and vaporized gas sections subject to a flowing in of ground seepage water toward the storage area caused by the interstitial pressure of the ground seepage water being higher than the stored liquified gas vapor pressure in the storage area comprising:
at least one water sump provided in the storage area, below the gallery;
a connection tube extending from the at least one water sump to the surface;
a vent tube extending from the vaporized gas section, through the liquified gas section, and opening into said connection tube within the at least one water sump;
an extraction tube extending from the at least one water sump to the surface;
a lateral tube extending from the liquid gas section and opening into said extraction tube within the at least one water sump; and
means for sealing said connection, vent, extraction and lateral tubes with water from the at least one water sump to prevent flow through said tubes to the surface, said sealing means including first and second valve means, associated with said connection and extraction tubes respectively, housed within the at least one water sump.

8. An arrangement according to claim 7, further comprising:
a filling tube extending from the at least one water sump to the surface; and
a second lateral tube extending from the liquid gas section and opening into said filling tube within the at least one water sump, said sealing means further including a third valve means housed in said filling tube within the at least one water sump.

9. An arrangement according to claim 8, wherein said sealing means further comprises supply lines, each of which extends from a respective one of said valve means to the surface, for ducting fluid to and from said valve means and shifting said valve means between said first and second positions.

10. An arrangement according to claim 8, further comprising a seepage extraction line extending from the at least one water sump to the surface and a third lateral tube extending from the liquid gas section and opening into said seepage extraction line within the at least one water sump.

11. An arrangement according to claim 10, further comprising:
a hollow cylinder having upper and lower portions located within said seepage extraction line;
a discharge line extending from within the lower portion of said cylinder to the surface;
a first one-way check valve secured to the, lower portion of said cylinder and opening into said seepage extraction line for permitting water in said seepage extraction line to flow into said cylinder;
a second one-way check valve attached to said discharge line for permitting water within said cylinder to flow into said discharge line;
a fluid pressure line extending from within the upper portion of said cylinder to the surface; and
means for selectively pressurizing and depressurizing the cylinder through said fluid pressure line, such that when the cylinder is depressurized, water will at least partially fill said cylinder through said first one-way check valve and when the cylinder is pressurized, the water in the cylinder will be forced through said second one-way check valve and out said discharge line.

12. An arrangement according to claim 10, further comprising a plurality of pressure gauges for measuring the pressure in said connection tube corresponding to the pressure in said vent tube, the pressure in the at least one water sump adjacent said seepage extraction line and the pressure in the at least one water sump adjacent at least one of said extraction and filling tubes respectively.

13. An arrangement according to claim 7, wherein said connection tube includes an inner end portion terminating within the at least one water sump and an annular reserve portion extending radially outwardly about said inner end portion, said annular reserve portion terminating in a lower end, said first valve means being located in said lower end.

14. An arrangement according to claim 13, further comprising a tubing line extending from said first valve means to the surface through said connection tube, said tubing line being adapted to shift said first valve means between a first position in which said first valve means seals said annular reserve portion from water in the at least one water sump and a second position in which water is permitted to flow into said connection and vent tubes to develop water plugs therein.

15. An arrangement according to claim 14, further comprising a crown deflector member secured to said tubing line below the inner end portion of said connection tube.

16. An arrangement according to claim 15, wherein the inner end portion of said connection tube is formed with a plurality of holes opening into said annular reserve portion.

17. An arrangement according to claim 7, further comprising a knock-out drum fluidly connected to said extraction tube at the surface, a pump adapted to receive liquidified gas from said knock-out drum, a compressor adapted to receive vaporized gas from said knock-out drum, and a condenser adapted to receive compressed gas from said compressor.

* * * * *